United States Patent
O'Leary et al.

(10) Patent No.: US 6,754,541 B2
(45) Date of Patent: Jun. 22, 2004

(54) CONTROL SYSTEM APPARATUS FOR LOADING A VALUE OF A SYSTEM PARAMETER AND PREVENTING CHANGE THERETO AFTER A PERIOD OF TIME

(75) Inventors: Scott P. O'Leary, Maple Grove, MN (US); James I. Bartels, Hudson, WI (US); Richard M. Solosky, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 239 days.

(21) Appl. No.: 10/026,410

(22) Filed: Dec. 21, 2001

(65) Prior Publication Data

US 2003/0120359 A1 Jun. 26, 2003

(51) Int. Cl.[7] .............................................. G05B 11/01
(52) U.S. Cl. .............................. 700/19; 700/14; 700/33; 700/39; 700/46; 700/274; 137/94; 236/15 BG; 236/15 C; 237/2 R; 237/2 A; 237/8 A
(58) Field of Search .............................. 700/14, 19, 33, 700/75, 79, 83, 276, 300, 301, 39, 46, 274, 73, 74; 713/1; 137/94; 236/15 BG, 15 C, 46 R; 237/2 A, 2 R, 8 A

(56) References Cited

U.S. PATENT DOCUMENTS

| | | | | |
|---|---|---|---|---|
| 4,469,274 A | * | 9/1984 | Levine | 236/46 R |
| 5,124,934 A | * | 6/1992 | Kawamoto et al. | 700/282 |
| 5,301,101 A | | 4/1994 | MacArthur et al. | 700/36 |
| 5,325,912 A | * | 7/1994 | Hotta et al. | 165/204 |
| 5,684,528 A | * | 11/1997 | Okutsu et al. | 348/14.1 |
| 5,924,486 A | | 7/1999 | Ehlers et al. | 165/238 |
| 5,956,557 A | * | 9/1999 | Kato et al. | 399/401 |
| 6,175,207 B1 | | 1/2001 | Melcher et al. | 318/661 |
| 6,618,634 B1 | * | 9/2003 | Hwang | 700/79 |
| 2001/0010267 A1 | * | 8/2001 | Kawarai | 173/180 |

* cited by examiner

Primary Examiner—Ramesh Patel

(57) ABSTRACT

A control system for controlling an operating system stores a system parameter such as an ultimate pressure value, for an operating system. The control system allows operation of the operating system only after an initial value of the system parameter has been loaded. In one embodiment, a data generator element intended normally to specify a set point for the operating system, is used to provide the system parameter value as well. The control system provides a grace period after a value of the system parameter has been entered during which the system parameter value can be changed. After the grace period ends, the system parameter value cannot be changed by the operating system manager under normal circumstances. A light source is flashed in various patterns to indicate to personnel which of several different actions available to the control system are occurring.

13 Claims, 5 Drawing Sheets

CONTROL SYSTEM APPARATUS FOR LOADING A VALUE OF A SYSTEM PARAMETER AND PREVENTING CHANGE THERETO AFTER A PERIOD OF TIME

BACKGROUND OF THE INVENTION

Certain types of systems for controlling devices have adjustable settings for control parameters. It is common for these settings to be adjusted by a human operator. A very simple example is the thermostat found in nearly every occupied space. Such settings define either implicitly or explicitly, a control range for the control parameter. The control range is defined by an upper value and a lower value, within which the control system attempts to hold the control parameter by altering a control variable for the device. In the thermostat example, the control variable is usually an on or off signal for the heating plant.

For a variety of reasons, many of these control systems require limits for these control parameter settings. For example, a thermostat might for energy efficiency be designed or programmed to prevent settings outside of a desired temperature range. In other systems, an ultimate maximum (or minimum) value is assigned to a particular parameter for reasons of safety, durability, etc. An example of such a situation (and the one concerning the inventors) involves setting maximum pressure for a boiler.

Every boiler has as one of its critical parameters, a maximum pressure that for safe operation must never be exceeded. Other types of operating systems have other parameters for which an ultimate value must be assigned. In the case of boilers, this maximum allowable pressure will be referred to as the ultimate pressure, and other similar parameter values in other types of systems as ultimate parameter values.

In the case of boiler operation, it is customary to set a maximum operating pressure for the range of allowable pressure levels that is lower than the ultimate pressure. The reasons for this include greater fuel and operating efficiency and increased lifetime for the individual boilers. One system now in use sets the maximum operating pressure and the ultimate pressure for boilers with a maximum pressure potentiometer having a scale for selecting settings. The position of the potentiometer selects the maximum operating pressure, and overrides the control range upper value if set above the maximum operating pressure. A cam or stop on the potentiometer sets the ultimate pressure. When boilers are inspected for safety, the position of the stop on the maximum pressure potentiometer is checked. If higher than the ultimate pressure, the boiler and its operator are in violation, for which a variety of sanctions may be imposed.

There are a number of problems with this system. Potentiometers are electromechanical devices and can fail or drift with respect to the scale over time either with use or with disuse. Tampering with either the ultimate pressure stop or the maximum operating pressure is fairly easy even though access to the potentiometer stop is typically made somewhat difficult.

In electronic control systems, it is cheaper and more reliable for the controller itself to provide the ultimate pressure setting. However, this creates the problem that inspectors (and conscientious operators themselves) cannot easily determine the ultimate pressure setting since most electronic controllers have only rudimentary status indicators. In order to effectively implement ultimate pressure limits in electronic controllers, it is necessary to provide a means for communicating the settings.

BRIEF DESCRIPTION OF THE INVENTION

We have devised a control system providing a control signal for controlling the activity of an operating system. Our control system sets a system parameter by using a manually adjustable data generation device nominally used to provide a control value signal changing as the data generation device is manually adjusted. The control value signal is often a set point, and in the operating system for which this control system was developed, the set point is a pressure value of a boiler. Controlling the amount of heat energy provided to the boiler by a burner controls boiler pressure. The control signal adjusts the heat output of the burner by regulating the amount of fuel flowing to the burner.

This control system comprises a configuration flag memory element recording a configuration flag having at least first and second values and providing a configuration flag memory signal encoding the configuration flag value. In the embodiment we envision, the configuration flag will be set to its first value at the factory.

A first memory element receives the control value signal and the configuration flag memory signal, and at some point records the control value signal as the system parameter responsive to the first value in the configuration flag memory signal. The first memory element provides a first memory signal encoding the recorded system parameter. For purposes of defining the invention, the first memory element includes not only the data storage components for recording the system parameter, but may also include the control components for processing the signals it receives to effect proper storing of the system parameter.

A second memory element receives the control value signal and records as a set point value, the control value signal. The second memory element provides a second memory signal encoding the recorded set point value.

A control element receives the first and second memory signals, and provides a control signal based on the first and second memory signals and that is usable by the operating system for controlling its operation.

In one version of this invention, the first and second memory signals may be pressure values. The control element uses the first memory signal to set a maximum or safety value for the operating system pressure. The set point value can be changed during normal operation of the operating system by adjusting the data generation device. The maximum pressure value typically varies from system to system, and so cannot be set at the factory. Instead the installer permanently sets the maximum pressure or other system parameter during system installation.

To provide for user communication with the operating system, a reset switch forming a part of the control system provides a reset signal responsive to manual operation thereof. During normal operation the reset switch is used to reset (restart) the system either during testing or after an error or other failure results in the control element locking out normal operation.

During initialization of the system, the first memory element receives the reset signal. The first memory element records the control value signal as the system parameter responsive to the combination of both the first configuration flag value in the configuration flag memory signal and the reset signal from the reset switch.

During an operating system installation procedure, some adjustment and experimentation is typically required to properly set the system parameter. Frequently, the installer will need to watch system operation for a time, and then perhaps change the system parameter. To accommodate such installation procedures, the configuration flag memory element includes a timer element recording a timer value. The control system frequently changes the recorded timer value to indicate elapsed time. The timer memory element provides a timer signal encoding the current timer value. The first memory element receives the timer signal, and records the control value signal as the system parameter responsive to the combination of the timer value falling within a preselected range and an occurrence of the reset signal. The operation of these elements can be used to establish after initializing the system parameter for the first time, a grace period within which the installer can alter (reset) the value of the system parameter.

In a preferred embodiment, the timer element receives the timer signal and sets the timer value recorded in the timer element to a preselected initial value within the preselected range of the timer value responsive to the combination of the timer value falling within a preselected range, and the reset signal. The effect of this combination of functions is to reinitialize the grace period each time the system parameter is reset.

Eventually, the installer will be satisfied with the value selected for the system parameter. After this point, to prevent tampering by unauthorized persons, the control system should prevent further altering of the system parameter. To accomplish this, the configuration flag memory element receives the timer signal, and responsive to the timer value falling outside of the preselected range, sets the configuration flag to the second value. When the second value of the configuration flag is sensed the control system no longer allows the system parameter to be altered.

In a further improvement to this system, the reset switch is designed to provide a separate reset signal responsive to each manual operation. The first memory element receives each reset signal, and records the control value signal as the system parameter responsive to the combination of two sequential reset signals, the timer value falling within a preselected range, and the configuration flag first value in the configuration flag memory signal.

An indicator light providing visible light responsive to a power voltage is another improvement. The indicator light allows for simple communication with the user and installer. A light controller responsive to the timer value falling within a first preselected range, for providing power voltage in a first preselected on-off pattern to the indicator light. This feature assists in alerting an operator that an initial value for the system parameter has not yet been set for the control system. In the preferred embodiment a preset value of the clock signals that an initial value for the system parameter has not yet been set.

A preferred control system's light controller further provides power voltage in a second preselected on-off pattern to the indicator light responsive to both of i) the configuration flag first value in the configuration flag memory signal and ii) the reset signal. This feature can inform an installer that an attempt to request resetting of the system parameter has been made. This second preselected on-off pattern of the indicator light only means that the reset request was successful. The installer still must select a system parameter value and request that it be accepted.

As previously mentioned, this control system is intended to control a pressure in an operating system such as a water boiler. For such an application the data generation device comprises a manually settable pressure selector. For this case, the control element comprises a level comparator providing the control signal based on the relative magnitudes of the system parameter and the control value. That is, if the pressure set point is set to a value higher than the system parameter value, then the system parameter value is used. This prevents the control system from selecting a set point that is too high.

In one version of the control system for controlling pressure, the system parameter defines the end of a pressure range and the control signal is suitable for controlling the level of a burner flame. The control element comprises a comparator receiving the first and second memory signals, and provides the control signal based on the system parameter when the control value is outside the pressure range, and provides the control signal based on the control value otherwise.

DESCRIPTION OF THE PREFERRED EMBODIMENTS

Hardware

Figure 1:
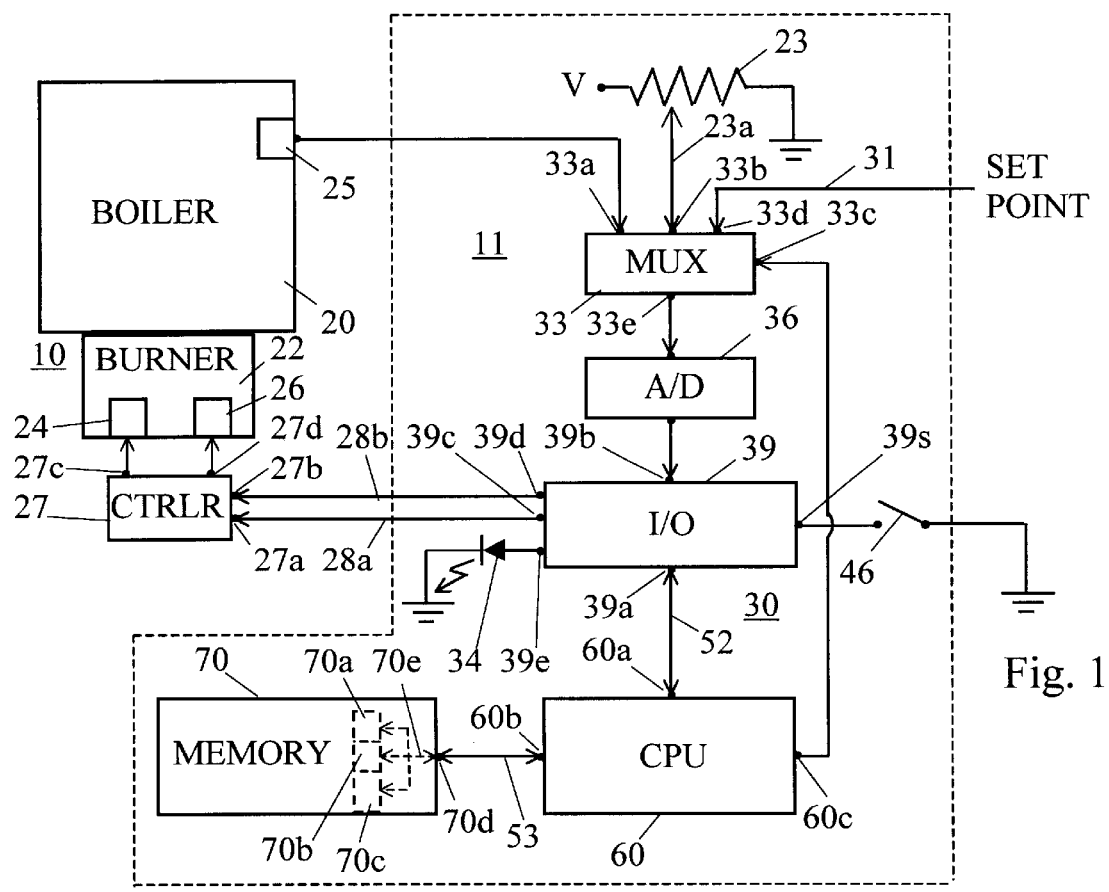
FIG. 1 is a block diagram showing hardware elements used in implementing the invention.

FIG. 1 is a diagram showing one possible hardware structure for the invention. The reader should realize that many other structures embodying the invention surely exist. No purpose would be served by attempting to itemize these alternatives because those familiar with control systems can easily transform the teachings below into these alternative applications. Further, such itemizing would properly subject this description to criticism for prolixity.

The invention resides mainly in the control system 11 to be described. Control system 11 is used here to control an operating system 10. The special features of control system 11 may well be useful for controlling a variety of operating systems different from that shown. For example, many of the novel features in control system 11 could be used as part of a control system for a security system.

Operating system 10 in this implementation is designed for heating water, and includes a boiler 20 and a burner 22 providing heat to boiler 20. Burner 22 conventionally includes fuel control valves 24 and 26, and, not shown, a fuel supply, a flame sensor, and a flame igniter. Boiler 20 includes a pressure sensor 25, and also not shown, a water intake, an intake valve, a steam or hot water outlet, etc. Other sensors for boiler temperature, steam or water flow rate, etc. are usually also present. All these components are found in typical boiler systems, and no further notice need be taken of them.

Fuel valve 26 controls flow of fuel in an on-off sense for burner 22. Fuel valve 24 modulates the amount of fuel flowing to burner 22 while valve 26 is open. A controller 27 provides power through terminals 27c and 27d to operate valves 24 and 26. Controller 27 receives at an input terminal 27a, a 4–20 ma. analog signal carried on path 28a whose current level specifies the setting or valve element position for valve 24. The signal at terminal 27a is used to control the signal provided at terminals 27c to valve 24. Of course, the signal on path 28a can take convenient forms other than a current signal. Path 28b provides to controller 27 at terminal 27b a signal that specifies whether safety fuel valve 26 should be open or closed.

Since the operating system for which this invention was developed is a steam or hot water generator, water or steam pressure is one critical parameter for boiler 20. Different boilers 20 have different maximum allowable, or ultimate, pressure limits or ratings. Ultimate pressure limits from one boiler system to the next have fairly wide ranges. Safety considerations demand that boiler 20 pressure not exceed its ultimate pressure limit. Because of this, it is necessary to carefully monitor boiler pressure, and decrease the flow rate through fuel valve 24 to reduce fuel flow to burner 22, or possibly even close valve 26, if boiler pressure reaches the ultimate pressure limit. Since the ultimate pressure limit depends on the particular boiler, it is necessary to set this value in control system 11 before placing the boiler in service. This value can either be set at the factory or in the field. However, since many boiler systems are designed for a particular or unique set of requirements, we find that it is common to set the ultimate pressure limit during the installation procedure.

One particular purpose of the invention to be described is to set this ultimate pressure limit value during the process of installing the operating system 10 and control system 11. Generally, this ultimate pressure limit can be considered to be a type of system parameter that is most easily set during installation, and one that often cannot be easily determined until all of the specifics of the operating system 10 are established. As mentioned, this system parameter can be a wide variety of values for many different types of operating systems.

To sense pressure within boiler 20, pressure sensor 25 is mounted in pressure sensing relationship with the pressurized water or steam in boiler 20. Pressure sensor 25 provides to a multiplexer input terminal 33a, a pressure signal comprising a sensor signal indicating the pressure within boiler 20. Pressure within boiler 20 is simply one example of a physical parameter that must be available to a control system and for which a limiting value must be provided to allow safe or efficient operation of the controlled system. In many situations it is difficult or impossible to specify this range of values prior to installing the control system, and it is for these kinds of control systems that the invention is intended.

A set point value is provided on path 31 to multiplexer input terminal 33d. This set point value specifies the desired pressure setting for boiler 20. The set point value can be provided by a thermostat for example, or can be simply a potentiometer setting. In fact, the set point value may be defined by upper and lower values of a control or set point range. The means determining the set point is not important.

A maximum operating pressure for boiler 20 is necessary to prevent an operator from specifying an undesirably high set point range. The setting of a wiper 23a for a limit potentiometer 23 provides a voltage comprising a potentiometer set point limit signal to a multiplexer terminal 33b. The position of wiper 23a, and hence the voltage at terminal 33b, is manually controlled by the boiler operator. A typical control system 11 also requires an ultimate pressure value that limits the maximum operating pressure selectable by wiper 23a. In the past, the ultimate pressure value was established by a mechanical stop on potentiometer 23 preventing the wiper 23a from rotating to a position that specified a pressure exceeding the required ultimate pressure value.

In one commercial version of this system, three models for three different pressure ranges are available. Wiper 23a has a shaft to which is attached a pointer. A scale surrounding the shaft has marks and a legend defining the selected pressure. Thus when the operator wishes to select a maximum operating pressure, she need only turn the wiper 23a to the desired pressure mark on the scale.

The control system 11 includes a controller 30 generally comprising a central processing unit (CPU) 60, a memory 70, an I/O section 39, an A/D converter 36, and an analog signal multiplexer 33. In most cases, CPU 60 and memory 70 can comprise a microprocessor of some type with either on-board memory or an additional memory element. CPU 60 may be able to simulate in one way or another the functions of A/D converter 36 and multiplexer 33, in which case there will not be a separate physical presence of these components. The various inputs and outputs of these components will be explained while discussing the sources and destinations of the input and output data. Note that CPU 60 and I/O unit 39 have two way communication through a data path 52 connecting terminals 60a and 39a. This allows controller 30 to send signals to external devices such as controller 27 and LED 34, as well as to receive data values from external sources.

Multiplexer 33 receives from a CPU terminal 60c at terminal 33c, a selector signal having first through third distinct values. Multiplexer 33 has the three input terminals 33a, 33b, and 33d mentioned above which receive analog signal voltages from pressure sensor 25 potentiometer 23, and the set point path 31. The value of the selector signal at terminal 33c determines which of the three signal voltages at terminals 33a, 33b, and 33d is gated to an output terminal 33e.

The signal voltage at terminal 33e is applied to an input terminal of A/D converter 36. A/D converter 36 changes the analog voltage level at terminal 33e to a digital signal provided to input terminal 39b of I/O unit 39. The pressure signal from sensor 25 is applied to terminal 33a and is gated to terminal 33e responsive to a first value of the selector signal at terminal 33c. The limit pressure signal from potentiometer 23 is applied to terminal 33b and is gated to terminal 33e responsive to a second value of the selector signal at terminal 33c. The set point signal on path 31 is applied to terminal 33d and is gated to terminal 33e responsive to a third value of the selector signal at terminal 33c.

I/O unit 39 exchanges data signals with CPU 60 at terminal 39a. I/O unit 39 also receives data signals at terminals 39b from A/D unit 36 and from switch 46 at terminal 39s. I/O unit 39 provides output signals at terminals 39c and 39d to controller 27, and to LED 34 at terminal 39e. At least the portion of I/O unit 39 providing the analog 4–20 ma. current signal at terminal 39c for path 28a (as discussed in connection with controller 27 above) is provided by dedicated circuitry not a part of the microprocessor of which CPU 60 forms a part. Thus, I/O unit 39 may possibly comprise two or more physically separate parts. One or more of these parts of I/O unit 39 (but not that generating the current signal at terminal 39c) can actually be present in the circuit package that includes CPU 60.

I/O unit 39 varies the current signal at terminal 39c provided to path 28a according to commands from CPU 60 to thereby modulate the setting of valve 24, and control the amount of heat supplied to boiler 20 and the pressure of the water or steam that boiler 20 holds. I/O unit 39 and CPU 60 collectively include a D/A converter (not shown) that CPU 60 can command to provide as a signal on path 28a, an analog current level specifying the desired flow rate through valve 24. The setting of valve 24 directly corresponds to the current level on path 28a. The signal on path 28b from terminal 39*d* on the other hand is digital and commands controller 27 to select the desired on/off condition for valve 26.

One feature we prefer for control system 11 that is useful during initialization, provides a signal on terminal 39*c* whose level indicates the value encoded in the signal at terminal 39*b*. This is a special mode of operation for I/O unit 39 active only during initialization. During this special mode, the signal on path 28*a* differs from the signal during normal mode, which specifies the setting and flow rate for valve 24. This special mode allows the signal at terminal 39*c* to indicate the level of the signal from potentiometer 23 provided to I/O unit 39 at terminal 39*b* simply by causing multiplexer 33 to select potentiometer 23 as the source for the signal on path 28*a*. During normal operation, when controller 11 is controlling operating system 10, CPU 60 causes I/O unit 39 to provide a signal on path 28*a* specifying the position of valve 24 determined by the control algorithm executed by CPU 60.

We expect that a printed table relating current at terminal 28*a* with pressure selected by potentiometer 23 will be supplied with the installation instructions for each control system 11. During initialization, the current on path 28*a* can be measured with a current meter. The installer consults this printed table when setting the ultimate pressure value. When the pressure corresponding to the current value at terminal 39*c* equals the required ultimate pressure value, then the operator can cause the pressure to be recorded as the ultimate pressure value for the particular control system 11.

A momentary contact pushbutton reset switch 46 allows a human to provide data or control signals to controller 30. Switch 46 has terminals connected between an I/O terminal 39*s* and ground. Closing reset switch 46 pulls the voltage at terminal 39*s* to ground. Terminal 39*s* may be a part of CPU 60, which senses a change in logic level when the switch closes.

A status indicator element 34, driven by a voltage at terminal 39*e*, allows controller 30 to provide visual indications to a human. Indicator element 34 typically is a simple LED as shown that emits visible light at the voltage and current provided by I/O unit 39, as shown by the zigzag arrow. Terminal 39*e* may be a part of CPU 60 if CPU 60 has adequate output power to operate indicator element 34. Regardless, the circuitry forming a part of I/O unit 39 that provides the power to and controls the operation of indicator element 34 may be denominated a light controller even if element 34 does not provide visible light.

Switch 46 and indicator element 34 have specific purposes in implementing the invention, and typically have other purposes after the invention operates during system setup. For example, an operator may use reset switch 46 to signal to controller 30 that an error condition that caused controller 30 to provide a closure signal on path 28*b* to safety valve 26 thereby shutting down burner 22, has been corrected.

The commercial embodiment of the invention includes sensing of switch 46 closings using so-called "debounce" logic, but this is not a specific feature of the invention. Where switch 46 is stated to be closed, this means nothing more than the state of the switch has been sampled a number of times over a period of a few seconds and has been found to be closed for a large percentage of those sampling events. The system may provide a unique indication such as a rapid flash from element 34 when switch 46 is first sensed as closed, and then a solid indication once the sampling period is over. This procedure is not specific to the invention either.

Multiplexer 33 transmits the potentiometer 23 voltage at input terminal 33*b* to output terminal 33*d* responsive to a second value of the selector signal at terminal 33*c*. In our preferred embodiment, a graduated and numbered scale or dial is fixed adjacent to a pointer carried by wiper 23*a*. As the wiper is moved to different positions, the pointer shifts to different graduations on the scale. In one embodiment, the numbers on the scale run from 0 to 4095, representing potentially 12 bits of resolution in the signal provided by potentiometer 23.

Memory 70 includes the ROM or PROM 70*c* storing the instructions executed by CPU 60 as well as the EEPROM 70*b* (electrically erasable PROM, and referred to as NV or non-volatile memory hereafter) and RAM 70*a* in which CPU 60 stores operands and data used or generated by instruction execution. NV memory 70*b* can be read as quickly as conventional RAM 70*a* or PROM, but is written orders of magnitude more slowly. Accordingly, it is customary to use RAM 70*a* for storing values being calculated for storage in NV memory 70*b* and after calculations have been completed, write the data to NV memory 70*b*. To assure that this data transfers accurately, it is customary to use some sort of testing of transferred data to assure accuracy. Some of this error testing activity will be shown in the software flow charts. Error testing activity does not really form a part of the invention but is included as part of the disclosure of the preferred embodiment.

The ultimate pressure limit value is stored in NV memory 70*b* by the installer during the commissioning or installation process. The operating pressure set point value provided by potentiometer 23 in the potentiometer signal is also stored in NV memory 70*b*. It is convenient to consider RAM 70*a* and NV memory 70*b* collectively as constituting a number of separate memory elements implementing a part of the invention and assigned to storing these two values and others as well. Each of these memory elements records a value encoded in a signal supplied to it and provides a signal representing the particular recorded parameter value.

An internal memory bus 70*e* carries data between a bus terminal 70*d* and the internal memory elements. Addressing hardware, not shown, routes the data between terminal 70*d* and the individual memory elements or locations.

For purposes of defining the invention, the memory elements of memory 70, also are assumed to include various logic or data processing functions. For example, the memory element that records the ultimate pressure limit, i.e., the system parameter, can be considered to also test certain conditions controlling data storage actions. That is, the software instruction execution by CPU 60 associated with storing the ultimate pressure limit also forms a part of the memory element storing the ultimate pressure limit. Similar comments apply for memory elements storing other of the parameters used by control system 11. The description following will attempt to identify the various logic components forming a part of these memory elements.

Software Introduction

The flowcharts of FIGS. 2–4*b* represent software instructions whose execution by CPU 60 transform controller 30 into apparatus that implements the invention. Those familiar with software design realize that first, software does in fact have a specific physical existence within the PROM 70*c* holding it and within the data processor or CPU 60 that executes the software, and second, that the CPU itself becomes a functional hardware element performing the programmed function while executing the software intended for that purpose. As to the first point, the instructions held in PROM 70*c* have a physical structure that incorporates the unique combination of software instructions loaded into and readable from PROM 70*c* and thereby uniquely defines its own structure by the physical characteristics of a memory holding the instructions. As to the second point, while the CPU 60 is executing the instructions for any particular function, CPU 60 becomes for that short period of time a physical functional element performing that function.

As instruction execution continues, CPU 60 successively becomes the physical embodiment of each of the functional elements intended by the programmer and defined by the flow charts. As a set of instructions for a particular function is re-executed, the processor can become that functional element as many times as is required. From this standpoint one can easily realize that a properly programmed data processor is a physical device in which an invention is physically implemented. A microprocessor type of data processor implementation is often preferred to discrete or special purpose hardware because of cost savings to produce, relatively easy development, and easy modification and upgrade.

It is useful to generally discuss the flowcharts of FIGS. 2–4*b* and the two types of symbol elements in them. These flowcharts define and describe the functions of software stored in PROM 70*c* of FIG. 1 and which implements various functions of controller 30 including those of the invention. Each symbol element represents one or more CPU 60 instructions or functions. The lines with arrowheads connecting the boxes signify the order in which the instructions symbolized by the elements are to be executed, with the flow of instruction execution following the direction of the arrowheads. Each element has within it a short verbal description of the function performed by the instructions represented.

Figure 2:
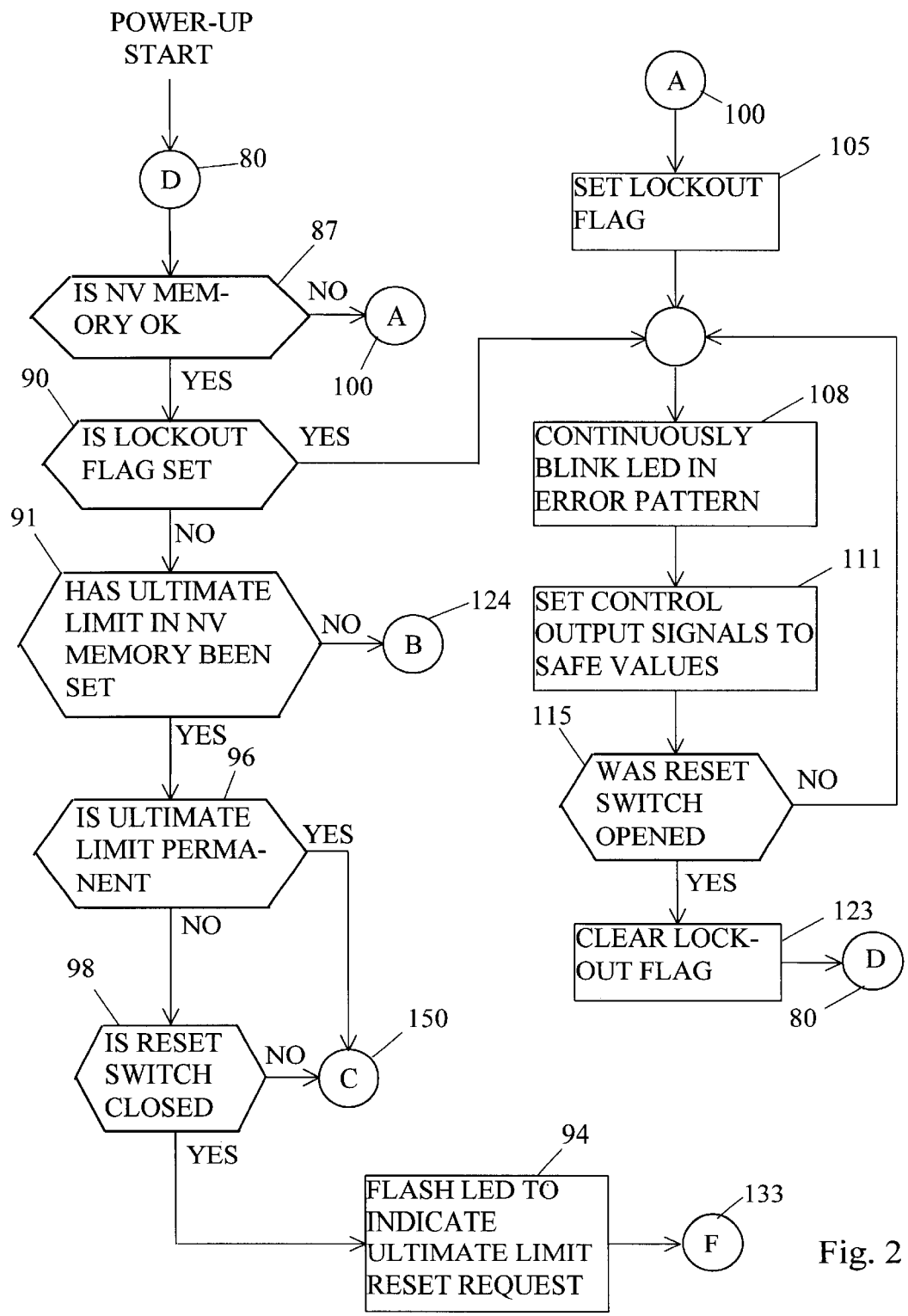
FIG. 2 is a flowchart of the invention's software processes during power-up of the hardware, and for error handling.

Rectangular boxes such as element 105 of FIG. 2 are activity (as opposed to decision) elements. Activity elements define some type of computational operation or data manipulation, such as an arithmetic operation or data transfer.

Hexagonal boxes as at 87 of FIG. 2 are decision elements and have two paths labeled "YES" and "NO" from them to two further symbol elements. A decision element symbolizes execution by CPU 60 of one or more instructions testing the specified condition or arithmetic or logical value indicated and causing instruction execution to branch to one or the other of the two paths depending on the result of that test.

Lastly, circles comprising connector elements as at 100 of FIG. 2 imply continuity of instruction execution between the same connector elements located at different points in the instruction sequence without direct connection between them by lines with arrowheads. That is, instruction execution continues from a connector element having a particular alphabetic definer, which an arrowhead contacts (of which there may be several), to the identical connector element from which an arrow exits (of which there will invariably be only one), as for connector element A 100. The letter in the circle designates the connector elements defining continuity of instruction execution. Blank circles such as below activity element 105 symbolize a common entry point from a number of elements to the element following the blank circle.

As explained above, the instructions that an activity or decision element symbolizes cause the controller 30 to become during execution of those instructions, the functional equivalent of a physical device that performs the stated function. Of course each functional element exists for only a short time, and during this time none of the other elements exist. However, nothing in the patent law requires all of the components of an embodiment described in a patent to simultaneously exist. Accordingly, one can describe and claim the invention using terms of art or functional terms describing these physical devices with reference to their implementing software. In the description that follows, software elements or groups of software elements comprising features of the invention will be identified on occasion.

Of course there are many different specific embodiments for these physical devices within CPU 60 that all provide similar functionality. Some may provide different advantages from others. We wish to include all of these possible different embodiments in the definition of our invention, and by no means limit ourselves to the specific embodiment shown in the flowcharts of FIGS. 2–4*b* and described below.

Software Description

When power is first applied to the microprocessor, internal circuitry directs instruction execution to a connector element D 80 and the immediately following decision element 87 in FIG. 2. Typical microprocessors are designed to start instruction execution at a prearranged instruction address after DC operating power is applied to the microprocessor.

As mentioned, to assure accurate operation of memory 70 some sort of memory testing is done at appropriate points. The type of memory testing is not particularly important to explaining this invention and indeed, is included only for completeness of description. On each power-up, the cyclic redundancy code (CRC) recorded in NV memory 70*b* is retested to assure proper operation. Decision element 87 tests NV memory 70*b* and if an error is found then execution transfers to the error-handling instructions starting with activity element 105 following connector element A 100.

The activity element 105 instructions start error handling by setting a lockout flag held in NV memory 70*b*. Instruction execution then continues to activity elements 108 and 111, which use LED 34 to indicate an error, and then return burner 12 to a safe configuration (fuel valve 26 closed, etc.). It is possible to use the speed and relative length of each flash of LED 34 to indicate the type of error. In general any type of detected error that raises the question of proper operation of the microprocessor will cause the lockout flag to be set by transferring execution to element 105.

Decision element 115 instructions then test whether switch 46 has been opened. If not, then execution returns to activity element 108. This loop continues until the operator finally opens switch 46 signaling that the problem has been corrected (which may require first closing switch 46). Instruction execution then proceeds to the instructions of activity element 123 causing the lockout flag to be cleared. Instruction execution then returns through connector element D 80 to activity element 87 to restart controller 30.

If the NV memory 70*b* CRC value is tested to be correct by decision element 87, then decision element 90 tests whether the lockout flag has been set. Finding the lockout flag to be set at this point implies that the lockout flag was set earlier by CPU 60 and then the power to controller 30 was lost. When power is then reapplied, an already set lockout flag if present is detected by element 90. Instruction execution in this case transfers to activity element 108.

If the lockout flag is not set, the instructions of decision element 91 are executed next. These instructions test the contents of an ultimate limit timer location in NV memory 70*b*. The ultimate limit timer functions as a type of a configuration flag that indicates whether the system parameter value has been initialized. The ultimate pressure limit is one type of system parameter requiring initializing before the control system 11 can be used to control operating system 10. The ultimate limit timer location in NV memory

70b is set at the factory to a first prearranged value that indicates no initialization of the system parameter has occurred. For example, all binary 1's in the ultimate limit timer can serve as a first configuration flag value indicating no initialization. The ultimate limit timer also other purposes in this embodiment to be described later.

As mentioned earlier, for purposes of defining the invention, it is convenient to include parts of the software elements as a part of the various memory functions. For this reason, decision element 91 is included as a part of what we call a configuration flag memory element. Other software elements will be identified as forming other parts of the configuration flag memory element below. Of course, these memory elements each can have many different specific configurations, each of which are designed to have equivalent functionality.

If system 11 is found by decision element 91 to not be initialized, then instruction execution jumps to connector element B 124 (FIG. 3) as indicated. When this condition exists, safety valve 26 is closed and the burner 22 cannot operate. This is necessary because if operating system 10 were allowed to operate with no ultimate pressure specified, a pressure higher than the maximum safe value could occur. But if the system has been initialized, then instruction execution transfers to decision element 96.

Decision element 96 tests the value of the ultimate limit timer to determine whether the ultimate limit value has become permanent. Most conveniently, this test is done by testing the ultimate limit timer value to equal a second prearranged value different from the first prearranged value, say all binary 0's.

We prefer to allow the installer a period of time after initializing the system to change the value of the ultimate limit. After this grace period has elapsed, which occurs when a time interval tracked by the ultimate limit timer has expired, no further programming or initialization of the ultimate value is allowable. At this time the value of the ultimate limit becomes permanent.

The effect of the element 96 instructions is to test whether the grace period exists during which the ultimate limit value or other system parameter can be changed. In one embodiment, the grace period is one hour long after setting the ultimate limit before the limit becomes permanent. Decision element 96 can be considered to form a part of a first memory element.

If the ultimate limit has become permanent, the instructions at connector element C 150 (FIG. 4a) associated with normal operation of system 10 are executed. If the ultimate limit is not yet permanent, the instructions of decision element 98 are executed next, which test whether switch 46 is closed. Decision element 98 also forms a part of the first memory element. If switch 46 is open, instruction execution proceeds to connector element C 150 for normal controller 30 operations. If switch 46 is closed, this means (most likely) that the operator wishes to change the ultimate limit value in NV memory 70b. Then the instructions of activity element 94 flash LED 34 in a unique pattern to indicate ultimate limit value reset after which the instructions symbolized by the elements in FIG. 3 following connector element F 133 are executed. Activity element 94 and other activity elements that cause LED 34 to flash in prearranged patterns form a light controller element.

Figure 3:
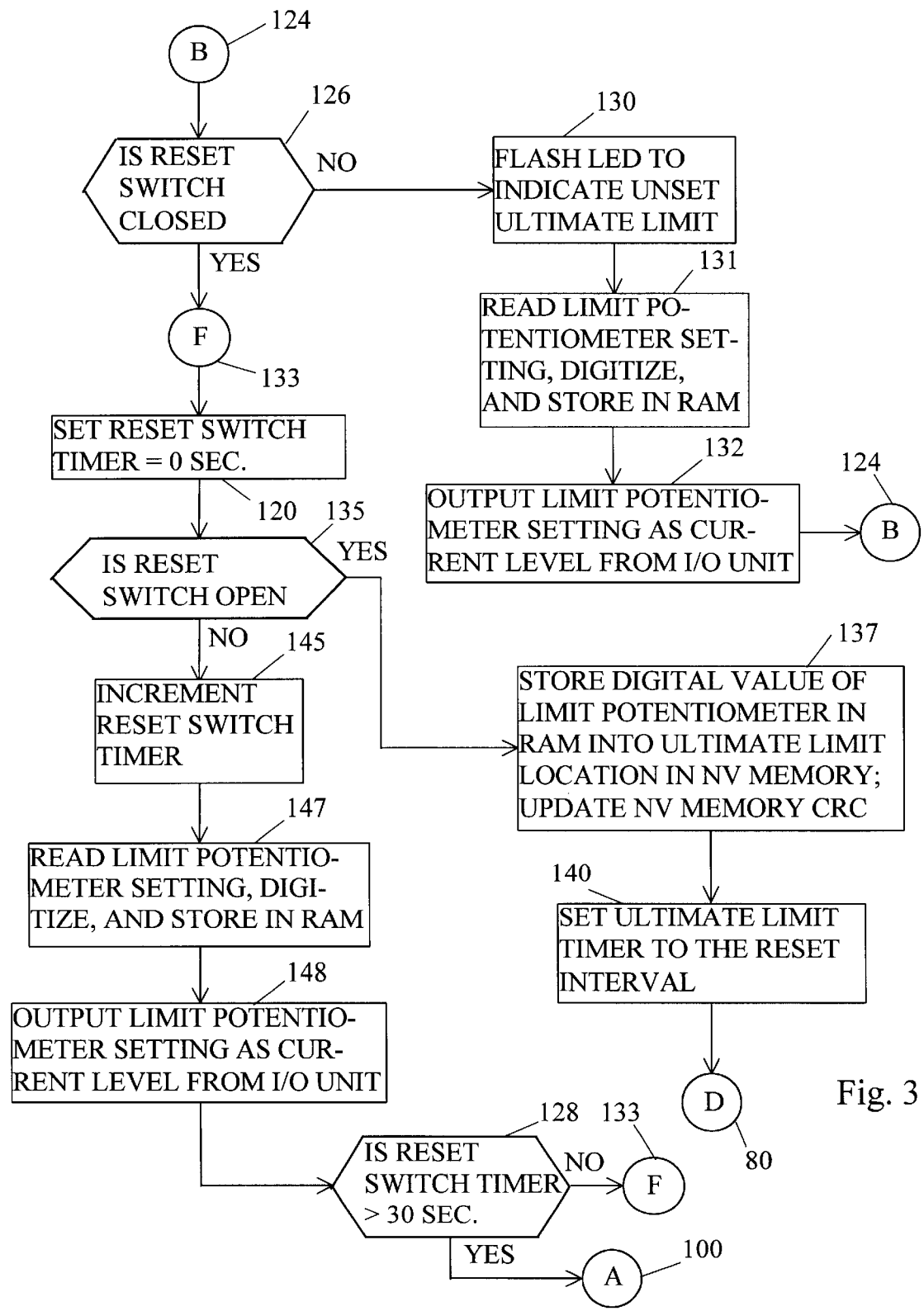
FIG. 3 is a flowchart of the invention's software processes for handling storage of a parameter during installation.

The instructions symbolized in FIG. 3 for the most part function to set and reset the ultimate limit value. Decision element 126 following connector element B 124 in FIG. 3 is executed only if the ultimate pressure limit value has not been initialized as determined by decision element 91. Element 126 along with activity elements 130, 131, and 132 cooperate to form a wait loop active when the ultimate limit value has not been initialized. Element 126 tests whether switch 46 is closed and if not, transfers execution to activity element 130 which provides a flashing pattern by LED 34 indicating that the ultimate pressure limit value has not been initially set.

Next, activity element 131 causes multiplexer 33 to gate the voltage provided by potentiometer 23 from terminal 33b to terminal 33d and A/D converter 36. A/D converter 36 converts the potentiometer 23 voltage to a digital signal and provides it to terminal 39b of I/O unit 39. Then CPU 60 executes the instructions of activity element 132, causing I/O unit 39 to provide at 39a the digital potentiometer 23 value to CPU 60, which then causes this digital value to be stored in RAM 70a.

Activity element 132 causes CPU 60 to provide at terminal 39c an analog current level corresponding to the digital value of the voltage provided by potentiometer 23. As mentioned above, the installer can with an ammeter read this analog current value. During the part of installation for setting the ultimate pressure value, the installer consults the table in the installation instructions that relates terminal 39c current level to pressure, and adjusts the position of wiper 23a to produce the terminal 39c current level assigned to the desired ultimate pressure limit. Decision element 126 and activity elements 130–132 form a part of the first memory element.

Once the instructions of decision element 126 detect that the installer has closed switch 46 (or if execution has transferred from connector element F 133 in FIG. 2) the instructions of activity element 120 are executed to set a reset switch timer held in NV memory 70b to an initial value of 0. The reset switch timer is used to detect whether switch 46 is closed for an excessive length of time, implying that switch 46 has malfunctioned.

Decision element 135 instructions test whether switch 46 is open. Decision element 135 is a part of the first memory element. If switch 46 is not open, the instructions of activity element 145 increment the reset switch timer. Then CPU 60 advances to execute the instructions of activity elements 147 and 148. Activity elements 147 and 148 are identical to activity elements 130 and 131 whose functions are described above.

After the instructions for elements 147 and 148 have been executed, the instructions of decision element 128 test the value of the reset switch timer. If greater than some preselected value, (30 sec. is shown in this example) switch 46 may be defective, and the error handling that starts following connector element A 100 occurs.

When the installer is satisfied with the potentiometer 23 setting she releases switch 46, causing decision element 135 to transfer execution to activity element 137. We expect the installer will typically close and then open switch 46 when first initializing control system 11 only after setting potentiometer 23 to the desired value. The activity element 137 instructions cause CPU 60 to store the digitized signal voltage supplied by potentiometer 23 as the ultimate limit value in an ultimate limit value location in NV memory 70b. The location in NV 70b storing the ultimate limit value forms a part of the first memory element. The NV memory 70b CRC value is also updated.

Then the instructions of activity element 140 are executed to set the ultimate value timer to a reinitialize, i.e. "grace period" interval. 60 minutes is one preferred value for the reinitialize interval. Activity element 140 is a part of a timer memory element. Instruction execution then follows connector element D 80 to restart controller 30. This series of instructions in FIG. 3 complete the process of initializing the ultimate limit value.

Figure 4A:
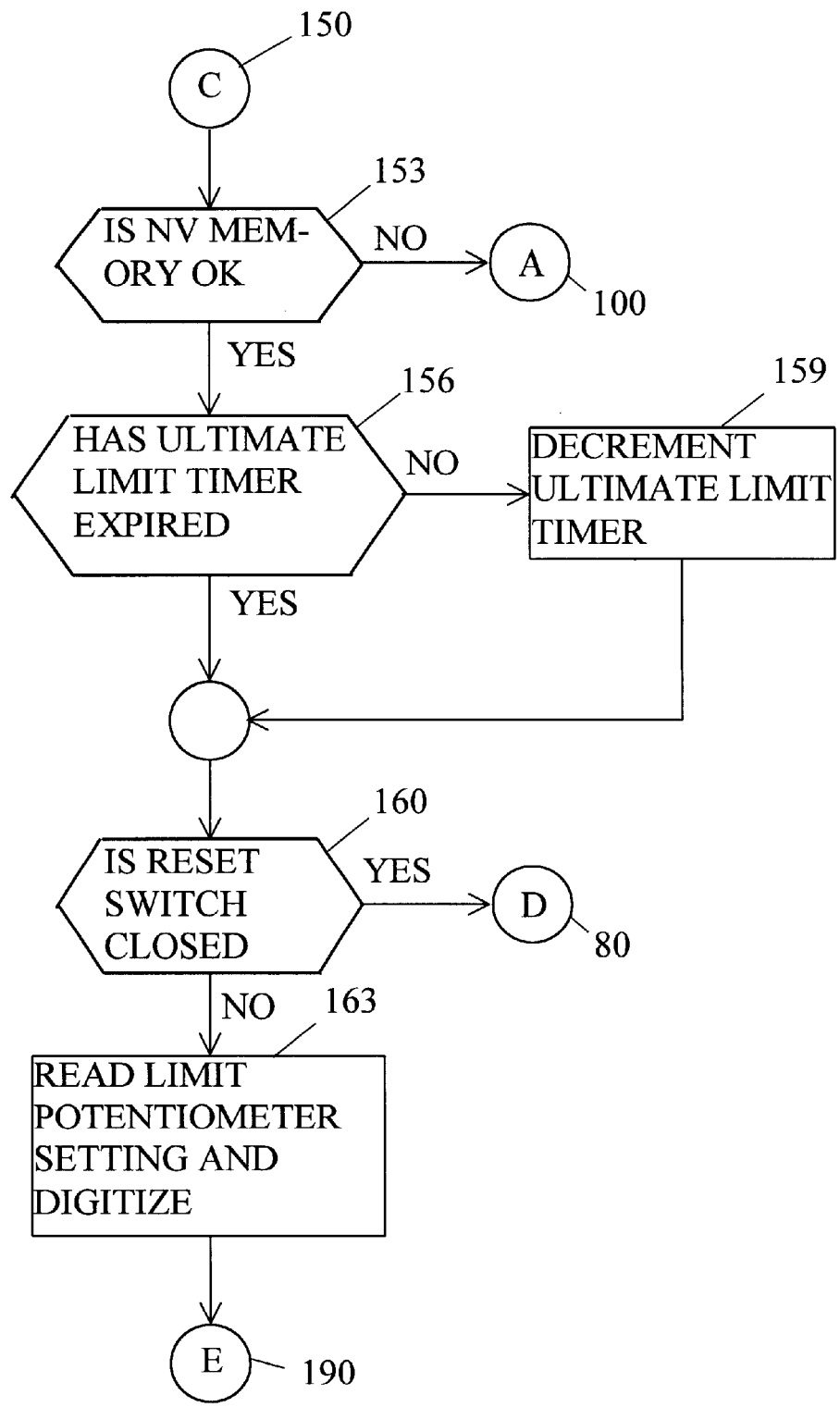
FIGS. 4a and 4b are a flowchart of the invention's software processes for handling normal operations using the installed parameters

If the ultimate limit value has been set when power is applied to control system 11, decision elements 96 or 98 in FIG. 2 direct execution to connector element C 150 in FIG. 4a and the instructions of decision element 153, which test NV memory 70b for errors. If no error in the contents of NV memory 70b is detected, then the ultimate limit timer value is tested by decision element 156 and if different from 0 the value recorded in the ultimate limit timer is decremented by element 159. Elements 156 and 159 form a part of the timer memory element. Connector element 150 starts the main control loop for control system 11, so the ultimate limit timer value is frequently updated to accurately indicate elapsed time.

Regardless of the state of the ultimate limit timer value, the instructions of decision element 160 are next executed, which test whether switch 46 is closed. If so, this indicates that the operator has requested controller 30 restart, and the instructions following connector element D 80 are executed.

If restart has not been requested, the instructions of activity element 163 are executed next. Activity element 163 and several of the elements shown on FIG. 4b perform activities of a control element for controlling the normal operation of operating system 10. The instructions of activity element 163 cause multiplexer 33 to gate the potentiometer signal from potentiometer 23 at terminal 33b to A/D unit 36. A/D unit 36 converts the potentiometer 23 signal to a digital value, which is then passed to I/O unit 39 and to CPU 60. CPU 60 stores the digitized value of the potentiometer 23 signal from A/D unit 36 in RAM 70a.

Figure 4B:
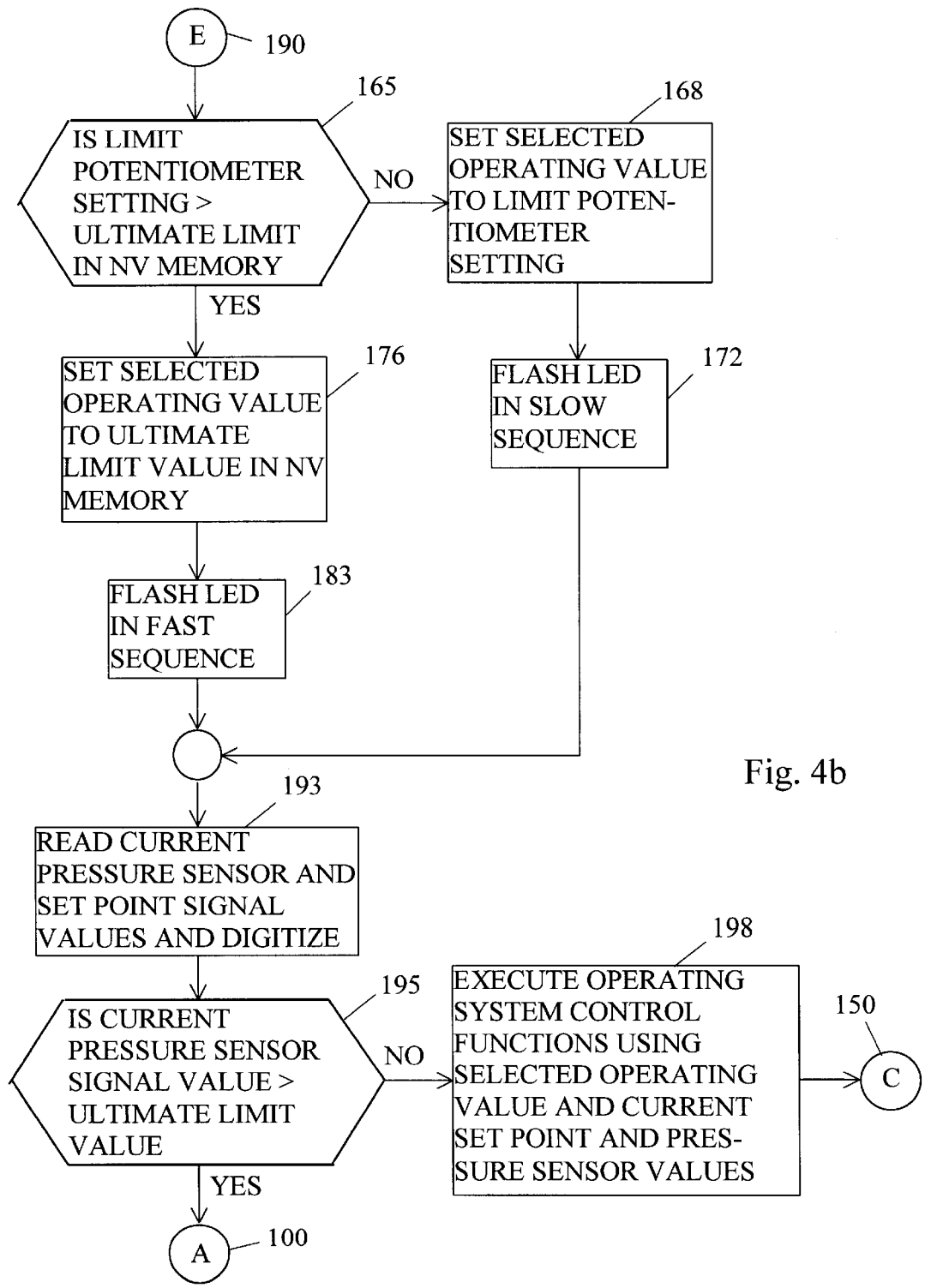

Instruction execution then follows connector element E 190 to decision element 165 on FIG. 4b. The instructions of decision element 165 test whether the value provided by potentiometer 23 is larger than the ultimate pressure limit value stored in NV memory 70b during initialization. If so, then the ultimate pressure limit value is selected as the selected operating value by the instructions of activity element 176, and LED 34 is flashed in a fast sequence by the instructions of activity element 183 to warn the operator of this possibly abnormal situation.

If the potentiometer signal value is not larger than the ultimate pressure value stored in NV memory 70b during initialization, the more normal situation, then the potentiometer signal value is selected as the selected operating value by the instructions of activity element 168, and LED 34 is flashed in a sequence much slower than the fast sequence, to signal the operator of this more normal situation. Activity elements 172 and 183 form a part of the light controller. Regardless of the outcome of the test by decision element 165, instruction execution then continues at activity element 193.

The instructions of activity element 193 cause multiplexer 33 to, one after another, gate the pressure sensor 25 signal and the set point signal on path 31 to A/D converter 36. These values of the current boiler 20 pressure and the set point are digitized by A/D converter 36 and sent through I/O unit 39 and CPU 60 to be loaded into RAM 70a. The instructions of decision element 195 then test whether the current pressure value exceeds the selected pressure value. If so, some type of malfunction has occurred, possibly excessive boiler 20 pressure. It is necessary in this case to indicate an error and shut off fuel flow to burner 22 by branching to the instructions following connector element A100.

If pressure in boiler 20 is found to be acceptable, then the instructions of activity element 198 perform further operating system 10 control functions using the selected operating value, the current set point value, and the current pressure sensor 25 value. One of these control functions use the selected operating, set point, and current pressure sensor values in providing the control signals on paths 28a and 28b to valves 24 and 26. At some point, all of these various functions are completed, and execution jumps back to the instructions following connector element C 150 to repeat the control loop.

Thus, it is possible to program a controller 30 to condition operation of controller 30 on initializing a system parameter and then to allow the parameter to be changed only during a short period of time at the beginning of its operating life. It is also possible to use a device such as a potentiometer 23 normally used to define a value used to provide an operating value such as an operating pressure limit, to also be used to input a system parameter value such as an ultimate pressure limit. As a part of the control functions, the controller 30 can provide an indication whether the selected potentiometer 23 setting conflicts with the system parameter value in some way, and when so, to select the ultimate value as the operating value.

We claim:

1. A control system for providing a control signal for controlling an operating system, said control system of the type having a manually adjustable data generation device providing a control value signal changing as the data generation device is manually adjusted, said control system comprising:

a) a configuration flag memory element recording a configuration flag having at least first and second values and providing a configuration flag memory signal encoding the configuration flag value;

b) a first memory element receiving the control value signal and the configuration flag memory signal for recording the control value signal as a system parameter responsive to the first value in the configuration flag memory signal and for providing a first memory signal encoding the recorded system parameter;

c) a second memory element receiving the control value signal for recording as an operating value, the control value signal and for providing a second memory signal encoding the recorded control value; and d) a control element receiving the first and second memory signals, and providing the control signal based on the first and second memory signals.

2. The control system of claim 1 including a reset switch providing a reset signal responsive to manual operation thereof; and wherein the first memory element receives the reset signal, and wherein the first memory element records the control value signal as the system parameter responsive to the combination of both the first configuration flag value in the configuration flag memory signal and the reset signal.

3. The control system of claim 2, wherein the configuration flag memory element includes a timer memory element recording a timer value, frequently changing the recorded timer value to indicate elapsed time, and providing a timer signal encoding the current timer value; and wherein the first memory element receives the timer signal, and wherein the first memory element records the control value signal as the system parameter responsive to the combination of the timer value falling within a preselected range and the reset signal.

4. The control system of claim 3, wherein the timer memory element receives the timer signal and sets the timer value recorded in the timer element to a preselected initial value within the preselected range of the timer value responsive to the configuration flag first value in the configuration flag memory signal, and the reset signal.

5. The control system of claim 4, wherein the configuration flag memory element receives the timer signal, and responsive to the timer value falling outside of the preselected range, sets the configuration flag to the second value.

6. The control system of claim 5, wherein the reset switch provides a separate reset signal responsive to each manual operation of the reset switch, and the first memory element receives each reset signal, and recording the control value signal as the system parameter responsive to the combination of two sequential reset signals, the timer value falling within a preselected range, and the configuration flag first value in the configuration flag memory signal.

7. The control system of claim 3, further including:
   a) an indicator light providing visible light responsive to a power voltage; and
   b) a light controller responsive to the timer value falling within a first preselected range, for providing power voltage in a first preselected on-off pattern to the indicator light.

8. The control system of claim 7, wherein the light controller further provides power voltage in a second preselected on-off pattern to the indicator light responsive to both of i) the configuration flag first value in the configuration flag memory signal and ii) the reset signal.

9. The control system of claim 8, wherein the data generation device is of the type comprising a pressure selector, and wherein the control element comprises a level comparator providing the control signal based on the relative magnitudes of the system parameter and the control value.

10. The control system of claim 9, wherein the control element cooperates with the light controller to provide a signal to the indicator light indicative of the current status of the control signal.

11. The control system of claim 8, wherein the data generation device is of the type comprising a pressure selector, wherein the system parameter defines the end of a pressure range, and wherein the control signal is suitable for controlling the level of a burner flame, wherein the control element comprises a comparator receiving the first and second memory signals, and providing the control signal based on the system parameter when the control value is outside the pressure range, and providing the control signal based on the control value otherwise.

12. The control system of claim 3, wherein the control element further receives the configuration flag memory signal and the timer signal, and wherein the control element responsive to the first value of the configuration flag memory signal and a predetermined value of the timer signal, suppresses providing of the control signal.

13. The control system of claim 1 wherein the first memory element receives the control value signal and the configuration flag memory signal and provides a control signal encoding the control value signal responsive to the first value in the configuration flag memory signal.

* * * * *